US006854367B2

(12) United States Patent
Ericksson et al.

(10) Patent No.: US 6,854,367 B2
(45) Date of Patent: Feb. 15, 2005

(54) CUTTING, TOOL SYSTEM AND MECHANISM FOR ACCURATELY POSITIONING A CUTTING EDGE

(75) Inventors: Håkan Ericksson, Kungsgården (SE); Tryggve Sörlund, Sandviken (SE)

(73) Assignee: Sandvik Aktiebolag, Sandviken (SE)

( * ) Notice: Subject to any disclaimer, the term of this patent is extended or adjusted under 35 U.S.C. 154(b) by 222 days.

(21) Appl. No.: 09/838,305

(22) Filed: Apr. 20, 2001

(65) Prior Publication Data

US 2002/0035902 A1 Mar. 28, 2002

(30) Foreign Application Priority Data

Apr. 20, 2000 (SE) .............................................. 0001473

(51) Int. Cl.[7] .............................................. B23B 29/00
(52) U.S. Cl. .............................. 82/138; 82/161; 82/160; 279/5; 279/159
(58) Field of Search .......................... 82/138, 161, 160, 82/158; 408/146, 147, 226, 238, 239 R, 231; 81/177.2; 279/5, 159; 403/321, 322.1, 322.2, 323, 359.5, 359.6

(56) References Cited

U.S. PATENT DOCUMENTS

| | | | | |
|---|---|---|---|---|
| 2,711,664 A | * | 6/1955 | Misuraca | 82/161 |
| 3,024,031 A | * | 3/1962 | Davidson | 16/429 |
| 4,420,280 A | * | 12/1983 | Gustafson | 407/109 |
| 4,692,073 A | * | 9/1987 | Martindell | 279/75 |
| 4,710,075 A | * | 12/1987 | Davison | 33/512 |
| 4,813,810 A | * | 3/1989 | Suzuki | 403/322.2 |
| 5,271,697 A | * | 12/1993 | Johnson et al. | 279/75 |
| 5,279,194 A | * | 1/1994 | Armbrust | 279/75 |
| 5,398,946 A | * | 3/1995 | Quiring | 279/145 |
| 5,624,214 A | * | 4/1997 | Carroll | 279/105.1 |
| 5,660,400 A | * | 8/1997 | Kasmeier et al. | 279/105.1 |
| 5,946,991 A | * | 9/1999 | Hoopman | 29/DIG. 23 |
| 6,379,089 B1 | * | 4/2002 | Sugiura et al. | 279/22 |

FOREIGN PATENT DOCUMENTS

| | | |
|---|---|---|
| SE | 509 421 | 1/1999 |
| WO | WO 81/03635 | 12/1981 |
| WO | WO95/35179 | 12/1995 |

* cited by examiner

Primary Examiner—A. L. Wellington
Assistant Examiner—Dana Ross
(74) Attorney, Agent, or Firm—Burns, Doane, Swecker & Mathis, L.L.P.

(57) ABSTRACT

A cutting tool system includes a clamping device and a cutting tool mounted therein. The cutting tool carries a cutting edge and includes a shaft clamped within an aperture of the clamping device. Prior to being clamped, the shaft is movable relative to the clamping device in either a longitudinal or rotational direction, in order to locate the cutting edge in a desired position. Either the clamping device or the cutting tool carries a spring-loaded device which engages a recess formed in the other of the cutting tool and clamping device when the cutting tool and its cutting edge are in a desired position, to provide an indication that the cutting tool is in such desired position by providing a sudden increase in a force necessary to displace the cutting tool out of such desired position.

30 Claims, 5 Drawing Sheets

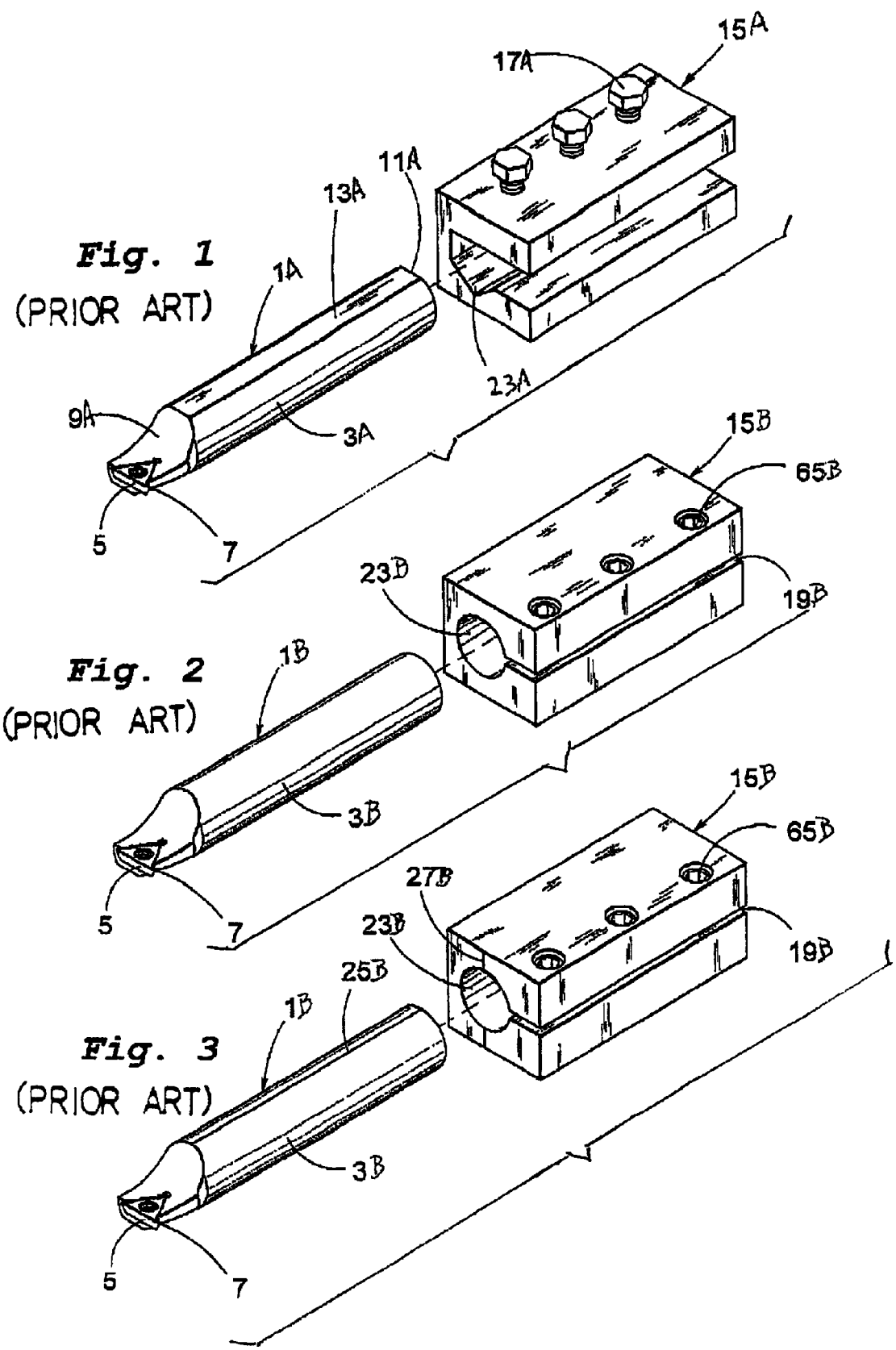

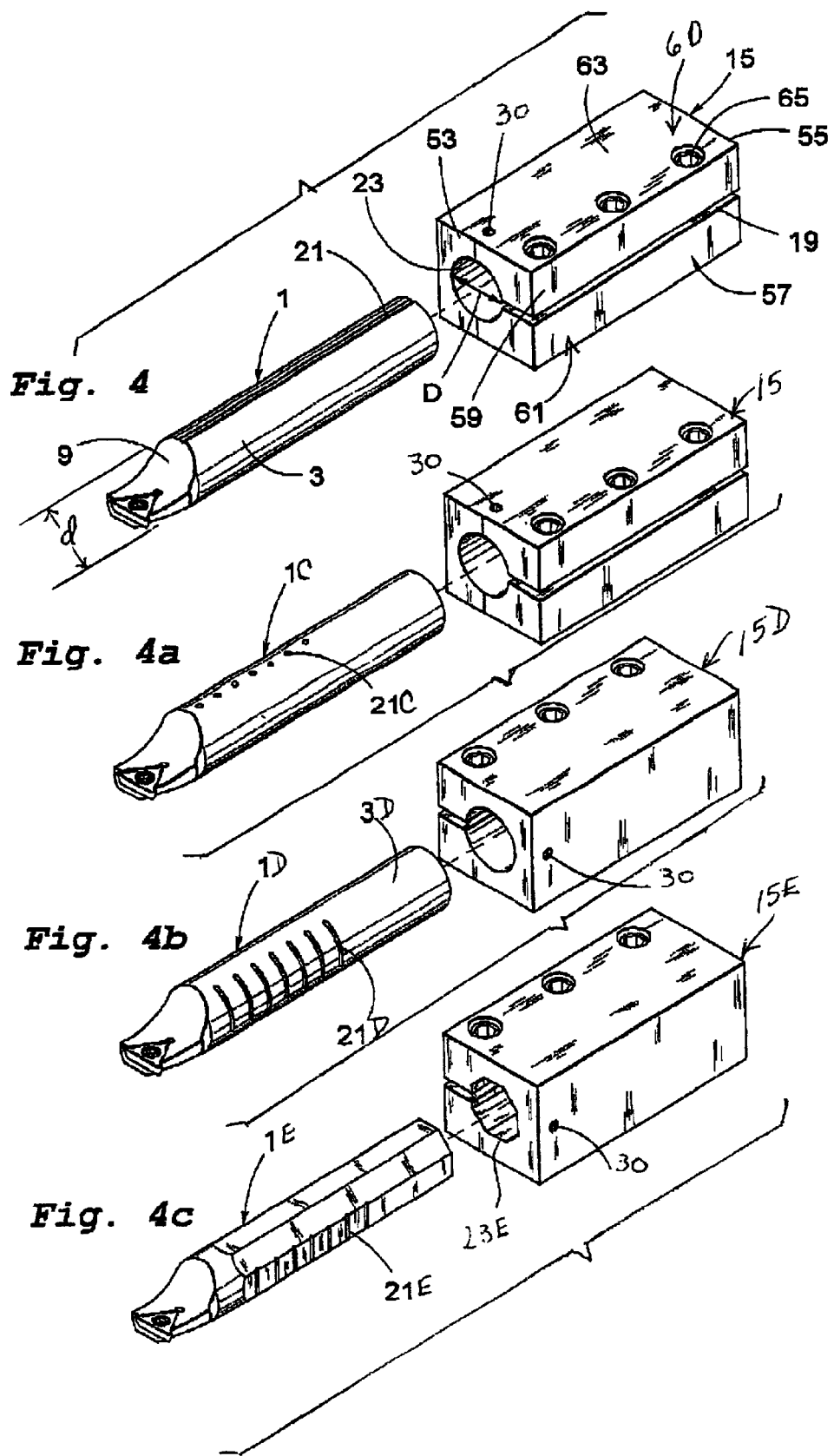

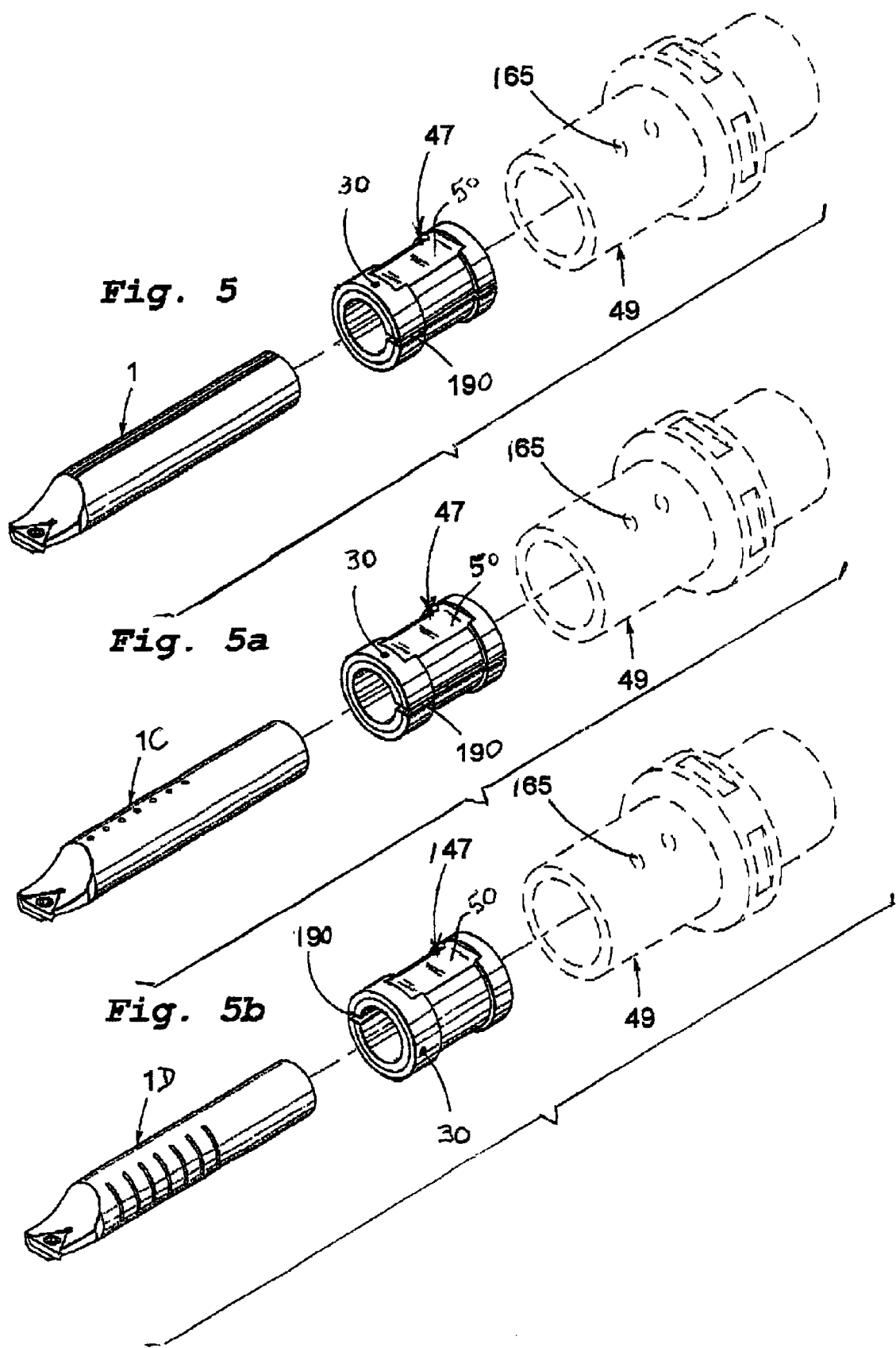

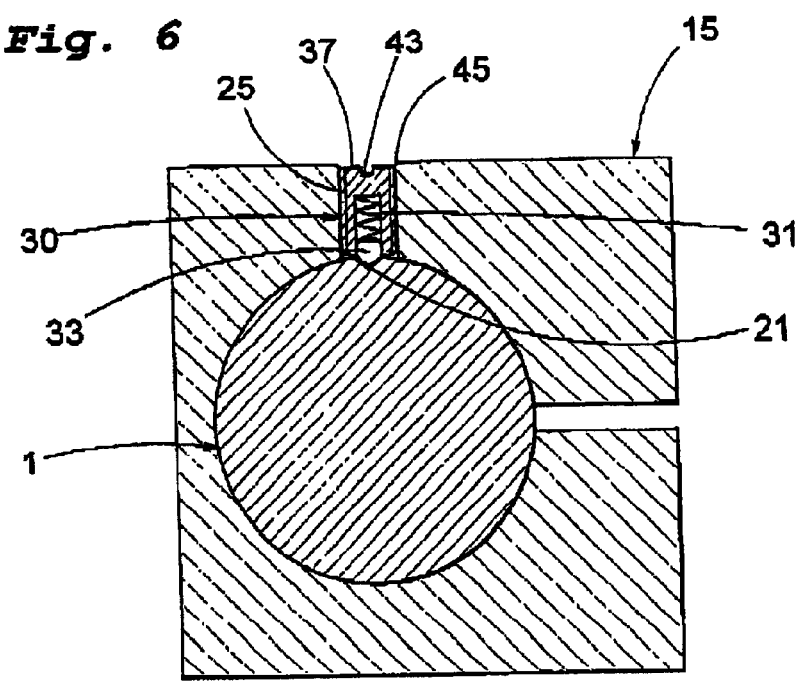
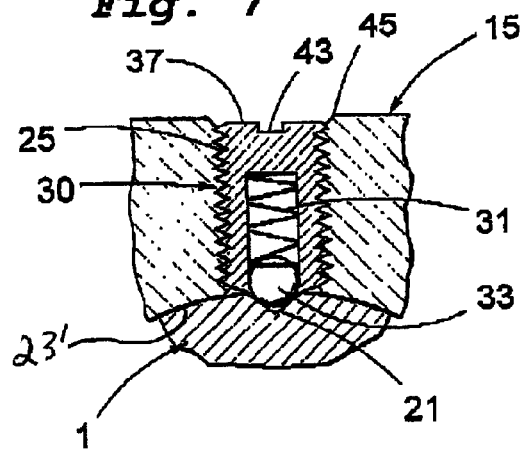
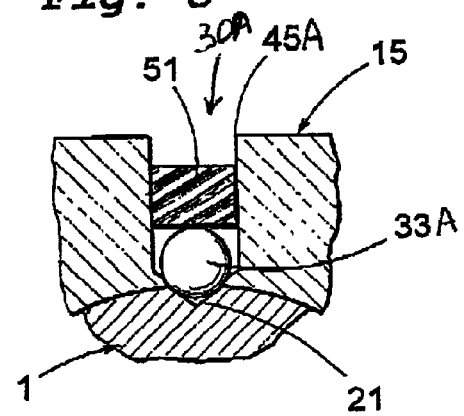

CUTTING, TOOL SYSTEM AND MECHANISM FOR ACCURATELY POSITIONING A CUTTING EDGE

This application is based on and claims priority of Swedish Patent Application No. 0001473-8, filed Apr. 20, 2000, the disclosure of which is incorporated by reference herein.

TECHNICAL FIELD OF THE INVENTION

This invention relates to a system for rapidly and accurately establishing the correct position of the operative cutting edge on tools for chip forming metal machining and in particular those used for internal turning such as boring bars which are clamped in tool clamping devices. Said cutting tools comprise a shaft and at least one cutting edge disposed at one end or both ends of the shaft. The cutting edge can be disposed on a cutting insert which can be attached to the cutting tool mechanically, for example by use of a screw, or metallurgically, for example by welding. Alternatively, the cutting edge can be an integral part of a solid, one piece tool shank. The cutting edge is positioned offset from the longitudinal axis of the cutting tool and at a greater distance from said axis than any other part of the tool. The cutting tool is held in place in the machine tool which enables the tool to be rotated around its longitudinal axis and/or slid longitudinally along that axis prior to being clamped in position. A relatively minor angular and/or longitudinal adjustment of the cutting tool has a significant effect on the position of the operative cutting edge of the insert in relation to a reference plane.

BACKGROUND OF THE INVENTION

Internal turning operations differ significantly from external turning operations in several aspects which must be taken into consideration if internal turning operations are to be optimized. Firstly, there is a limited space inside the workpiece. This influences the design of the cutting tool; it is essential that the optimum compromise between maximum strength/rigidity and minimum volume be found. In practice, one solution involves the provision of a bar, which is cylindrical in cross section, and in practice most bars are substantially cylindrical although one or more longitudinal planar surfaces which are parallel to the longitudinal axis of the bar may be incorporated. Said planar surfaces are used to fix the rotational position of the bar in the tool-clamping device. Thus the need to be able to fix exactly the rotational position of the bar and hence the height of the operative cutting edge in such cases is achieved at the expense of a somewhat weaker design of the bar, since by machining the planar surfaces into the bar, the amount of material in the bar is reduced.

The limited space inside the workplace within which the tool must operate also makes chip forming, chip flow and chip breaking far more critical than in external turning operations since the failure of any of these chip-related activities can lead to chip jamming, damaged tools, poor finish on the machined surfaces and tool vibration. Tool manufacturers put considerable effort into designing cutting inserts and tool holders for internal turning operations which minimize those problems, but to be successful it is essential that the position of the cutting edge relative to the workplace be exactly as the manufacturer intended.

Secondly, internal turning operations differ from external ones in that vibration of the tool is always present and it has a major influence on tool life, surface finish and productivity. Incorrect positioning of the cutting edge may lead directly to cutting forces which differ from those for which the tool was designed, and the negative effects on chip forming will also often lead to vibration.

Swedish Patent 500 836 teaches the use of a spirit level in contact with a flat planar upper surface of a boring bar which is used to ensure that the operative cutting edge of the insert mounted on the cutting tool is clamped in a pre-determined position. This solution has the disadvantage (already mentioned) that the machining of the planar surface decreases the material in the bar and hence its strength. Furthermore the use of a spirit level is not desirable because of the limited space and poor accessibility in a modern machine tool plus the difficulties of reading a spirit level in the presence of cooling fluid and chips.

International Publication WO 95/35179 teaches the use of a partially cylindrical boring bar with two planar longitudinal surfaces running parallel to the longitudinal axis of the bar. Said surfaces abut against matching surfaces in a "V" shaped groove in the tool block. This solution also involves a weakening of the bar as described in the previous example.

Swedish Patent 509 421 teaches the use of a setting device to determine the angular position of a cutting tool and cutting edge. The cutting tool is locked in position in the device using a fixing element, which interacts with a cylindrical aperture in the envelope surface of the cutting tool. A rotatable disc with angular markings is then used together with a spirit level to determine the angular position of the cutting edge. This solution is time consuming to use and is not suitable for the limited space and poor accessibility in a machine tool.

SUMMARY AND OBJECTS OF THE INVENTION

The aims of the present invention are to eliminate the disadvantages of previously known methods for determining the exact position of the operative cutting edge.

The first objective is to create a system which can be used on a bar which is substantially cylindrical, i.e., the requirement of one or several planar reference surfaces or a deep "V" groove which weakens the bar is avoided.

A second objective is to provide a system which is simple and lends itself to easy use in the confined space, poor lighting and dirty environment found in a machine tool, and which can also be a useful aid for machine operators who are blind or have poor sight.

Thirdly to create a system that can be reasonably priced when supplied on new tools or as conversion kits for older installations.

These and other aims are achieved by a cutting tool system comprising a clamping device and a cutting tool mounted therein. The clamping device includes a clamping block having an aperture defined by an aperture surface. The cutting tool includes a front portion at which a cutting edge is disposed, and a shaft extending rearwardly from the front portion. The shaft is fixed in the aperture by a clamping force that is releasable to enable the shaft to be displaced relative to the clamping device to a desired position for properly orienting the cutting edge. The shaft includes an outer envelope surface facing the aperture surface. A spring-loaded device projects from either the envelope surface or the aperture surface and yieldably edges a recess formed in the other of the envelope surface and the aperture surface when the cutting tool is in the desired position, to provide an indication that the cutting tool is in such desired position by requiring a sudden increase in force necessary to displace the cutting tool from the desired position.

BRIEF DESCRIPTION OF THE DRAWINGS

The objects and advantages of the invention will become apparent from the following detailed description of a preferred embodiment thereof in connection with the accompanying drawing in which like numerals designate like elements, and in which FIG. 1 is a perspective view of a prior art combination of cutting tool and tool clamping device.

FIG. 2 is a perspective view of prior art showing another combination of cutting tool and tool clamping device.

FIG. 3 is a perspective view of prior art showing yet another combination of cutting tool and tool clamping device.

FIG. 4 is a perspective view of a cutting tool and tool clamping device according to the invention.

FIG. 4a is a perspective view of an alternative application of the invention.

FIG. 4b is a perspective view of a further alternative application of the invention.

FIG. 4c is a perspective view of still another alternative application of the invention.

FIG. 5 is a perspective view of yet another alternative application of the invention.

FIG. 5a is a perspective view of one more alternative application of the invention.

FIG. 5b is a perspective view of still another alternative application of the invention.

FIG. 6 is a cross-sectional view of the cutting tool, tool-clamping device and spring-loaded device.

FIG. 7 is a detailed cross-sectional view of the first embodiment of the spring-loaded device.

FIG. 8 is a detailed cross-sectional view of a second embodiment of the spring-loaded device.

DETAILED DESCRIPTION OF PREFERRED EMBODIMENTS OF THE INVENTION

Figure 9:
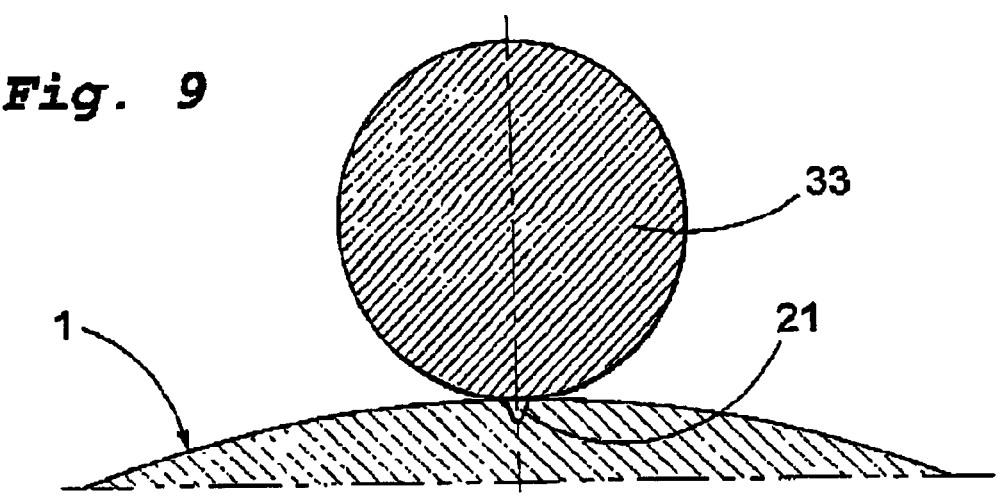
FIG. 9 is a cross-sectional view of the locating device.

FIG. 1 illustrates a typical prior art combination consisting of a cutting tool 1A, for example a boring bar, and a tool-clamping device 15A. The cutting tool consists of a substantially cylindrical shaft portion 3A with front 9A and rear ends 11A. The front end accommodates at least one cutting insert 5. The cutting tool 1A is located and secured in the tool clamping device 15A by means of at least one clamping screw 17A acting on a planar surface 13A formed on the upper side of the bar. The lower part of an aperture 23A formed in the tool block is V-shaped. This solution is commonly used but is not recommended since it gives a limited clamping force because of the restricted contact surface of the tips of the screws on the surface 13A and poor location of the bar and hence poor repeatable accuracy of the height of the cutting edge 7.

FIG. 2 illustrates another prior art clamping method in which a substantially cylindrical cutting tool 1B is accommodated in a correspondingly substantially cylindrical aperture 23B in a tool block 15B. Said block features a longitudinal split 19B along the entire length of one side. One or more screws 65B are arranged perpendicular to the split and pass from the upper surface of the block though non-threaded apertures and through the split and into threaded apertures in the block below the split. When the screws are tightened the split is caused to narrow and as a consequence the effective diameter of the aperture 23B is reduced. In this manner a clamping force is exerted by the inner surface of the aperture 23B onto a large contact surface of the substantially cylindrical shaft 3B. This solution provides an excellent clamping force but no means of obtaining positional accuracy. To be able to accurately locate the height of the cutting edge 7 on the cutting insert 5 a reference surface and dial gauge are required.

In FIG. 3a prior art solution is shown which is similar to that in FIG. 2 in that a cylindrical cutting tool 1B is located in the tool block but here a scribe line 25B has been provided the upper side of the bar running longitudinally and parallel to the axis of the boring shaft 3B. A scribe line 27B is also provided on the front face of the tool block. When installing the cutting tool in the tool block the operator can visually align the scribe line on the cutting tool with that on the front face of the block and hence ensure that the height of the cutting edge 7 is established with a certain degree of accuracy. The bar is then secured in the aperture in the tool block as described in connection with FIG. 2. In practical tests, as described below, it has been established that this method does not ensure acceptable repeatable accuracy of the height of the cutting edge.

FIG. 4 illustrates a cutting tool and tool block according to the invention. The cutting tool 1 comprises a substantially cylindrical shaft portion 3 and a front portion 9. Said front portion carries a cutting insert 5 having at least one cutting edge 7. Alternatively, the cutting edge could be integral with, e.g., machined in, the shaft portion 3. The upper envelope surface of the shaft is equipped with a recess 21 in the form of a groove of V-shaped cross-section (see FIG. 7), which runs parallel with the longitudinal center axis of the bar. The groove has a symmetrical cross sectional form comprised of two downwardly converging side surfaces which, as seen in cross section, are of equal length. The outer diameter of the cylindrical part of the cutting tool is denoted "d". The tool block 15 features an aperture 23, which runs the entire length of the block with openings both at the front, and rear surfaces 53, 55. The diameter D of the aperture 23 is somewhat larger than the outer diameter "d" of the cutting tool. A longitudinal split 19 links the bore to one of the side surfaces 57 of the tool block along the entire length of the tool block. One or more holes extend from the upper surface 63 of an upper portion 60 of the tool block and run vertically downwards through the split 19 and into a lower part 61 of the block. The lower part of each hole is threaded to enable a clamp actuator in the form of a screw 65 to be passed downwardly through the upper part of each hole (disposed in the upper part 60 of the block 59) and screwed into the lower part 61 of the hole. The action of these screws forces the parts 60, 61 of the block together thus reducing the effective diameter "D" of the aperture, for clamping the cutting tool accommodated in said bore. Furthermore the tool-clamping device 15 features a bore 45 running vertically downwards from the upper surface of the block 63 and opening up in the aperture 23 which accommodates the bar. Said bore is located close to the front edge of the block where the upper surface 63 meets the front face 53. The center line of the bore 45 intersects the center line CL2 of the aperture 23. This bore 45 accommodates a spring-loaded device 30, which is illustrated in more detail in FIG. 6. The groove 21 interacts with the spring-loaded device to give a slight but significant increase of the force required to rotate the cutting tool around its center longitudinal axis as it passes the point of interaction (i.e., the point where the spring-loaded device engages the recess 21). Once the correct rotational location has been thus established by "feel", the cutting tool is clamped in the damping device by tightening the screws 65.

FIG. 4a illustrates a second embodiment of the invention in which the recess or recesses 21C are in the form of symmetrical, inverted, conical dimples in the envelope surface of the tool carrier 1C. The dimples have a basically V-shaped cross section irrespective of whether the cross section of the cutting tool is taken along the length of the cutting tool or at 90 degrees to it. If a plurality of such dimples is used they are to be arranged in a line parallel to the center line of the cutting tool and to be spaced at regular intervals for example 10 mm from each other. The positioning of the spring-loaded device 30 is the same as in the embodiment described in FIG. 4 and the interplay between the spring-loaded device each dimple is similar. Thus the device provides an indication in this case of both the rotational position of the cutting tool and its longitudinal position.

FIG. 4b illustrates a further embodiment of the cutting tool where, in this case, recesses in the form of circumferentially extending grooves 21D of V-shaped cross section positioned in the envelope surface of the shaft portion 3D and running all the way or part of the way around the shaft circumference in respective planes oriented at right angles to the longitudinal center axis of the cutting tool 1D. The grooves 21D are spaced longitudinally at regular intervals from each other, for example at 10 mm spacing. The interaction with the spring-loaded device 30 of the tool block 15D is similar in this case to those described earlier with the exception that the solution described here can only be used for establishing the longitudinal location of the cutting tool in the clamping device.

FIG. 4c illustrates a further embodiment of the invention that is very similar in design and function to that shown and described in connection with FIG. 4b. The difference in this case is that the shaft portion of the cutting tool 1E and the matching aperture 23E in the clamping device are prismatic (polygonal cross section) rather than cylindrical. Recesses in the form of grooves 21E are provided on one or more of the planar faces of the cutting tool. Each of the planes is oriented at a right angle to the longitudinal center line of the cutting tool. The interaction with the spring-loaded device 30 can only be used for establishing the longitudinal location of the cutting tool in the clamping device 15E.

FIGS. 5, 5a and 5b illustrate the invention as used in an arrangement that is especially suited for modern machine tools. In this case the clamping block comprises a sleeve 47 that has been introduced between the bar and a tool adaptor 49. The sleeve is designed to accommodate a spring-loaded device 30, as also is the adaptor in exactly the same manner as described above in connection with FIG. 4. As described previously the spring-loaded device is used only to give an indication of a required position prior to clamping the cutting tool. In this solution clamping is carried out with the help of the screws 165, which lock the sleeve in position through interaction with the planar surface of a whistle notch 50 of the sleeve 47 and at the same time exert a pressure on the sleeve causing the slit 190 to narrow, hence clamping the cutting tool in the sleeve.

FIGS. 6 and 7 illustrate a cross section through the cutting tool 1, clamping device 15 and the spring-loaded device 30. The spring-loaded device is installed in bore 45 close to the upper front edge of the tool-clamping device. The position of the device in the bore is carefully adjusted to ensure the correct interplay between the spring-loaded device 45 and a dimple or groove 21 in the envelope surface of the shaft portion 3. The spring-loaded device 30 consists of a cylindrical housing 25 with an external thread and a groove 43 in the one end surface 37, said groove 43 being designed to accommodate the tip of a screw driver which is to be used when screwing the spring-loaded device into place in the tool block. The cylindrical housing has a blind bore at its lower end into which a coil spring 31 and a rotatable element in the form of a sphere 33 (or a cylinder—not shown) are mounted. The sphere 33 projects downwardly beyond an aperture surface 23'. Thus, when the blind bore in the housing and the "V" groove 21 (or dimple 21C) in the outer envelope surface of the cutting tool are aligned radially, the sphere will be pushed by the force of the spring partially into said groove. The size of the sphere and the depth and angle of the sidewalls of the groove 21 are carefully chosen to ensure that the sphere does not become fixed in the groove. Preferably, the V-shaped recess and the sphere 33 are configured such that when the sphere is seated symmetrically in the recess, the center of the sphere (or the cylinder, if used) is disposed outside of the recess. The combination is designed simply to give a mechanical (and on occasion also a slight audible) indication that the spring-loaded device and groove are aligned, and hence the height and/or the longitudinal position of the operative cutting edge is correct. The mechanical indication is in the form of a slight but distinct increase in the manual force required to rotate the bar to displace the sphere 33 from the groove or dimple. The spring-loaded device may produce an audible signal in the form of a "click" sound heard when the sphere locates in the groove. Naturally it may not always be possible to hear the audible signal because of a surrounding high noise level. In the embodiment according to FIGS. 4a–4c there will also occur an increased force required to move the bore in the direction of its longitudinal axis when the spring-loaded device is engaged in the dimples 21C or grooves 21D, 21E.

Although contact between the spring-loaded device and the groove 21 has been performed by the sphere 33, it is possible to replace the sphere by a cylinder. Said cylinder would be mounted with its center axis extending parallel to the center axis of the boring bar. The supporting arrangement for this cylinder would be somewhat different from that for the sphere or cylinder of the main embodiment but its function would be the same.

FIG. 8 is a detailed cross-sectional view of a second embodiment of the spring-loaded device 30A in interaction with the "V" groove 21 on the circumference of the cutting tool. In this particular case the construction of the spring-loaded device has been simplified so that it consists of just a sphere 33A and an elastic, for example rubber, cylindrical cap 51 which serves both to retain the sphere (or cylinder) in place and allow the sphere (or cylinder) to move slightly upwards when a pressure is applied from below. The diameter of the aperture 45A is reduced at the lower end to ensure that the sphere 33A is retained in the aperture whilst still allowing the sphere to protrude sufficiently so that it can interact with the "V"-groove (or dimple) on the envelope surface of the cutting tool. The elastic has a Youngs modulus far lower than the material of the sphere 33A (e.g., steel).

FIG. 9 is a cross section of the sphere 33 (or cylinder) of the spring-loaded device and the cutting tool 1, showing the interplay between the sphere and the recess 21 substantially to scale. The diameter of the sphere or cylinder is typically in the range 2–5 mm, most preferably 2.5 mm. The depth of the V-shaped recess is typically in the range 0.01–0.2 mm, most preferably 0.04–0.06 mm. The cone angle of the V-shaped recess lies between 35–85°, more preferably 55–65° and most preferably about 60°.

Figure 10:
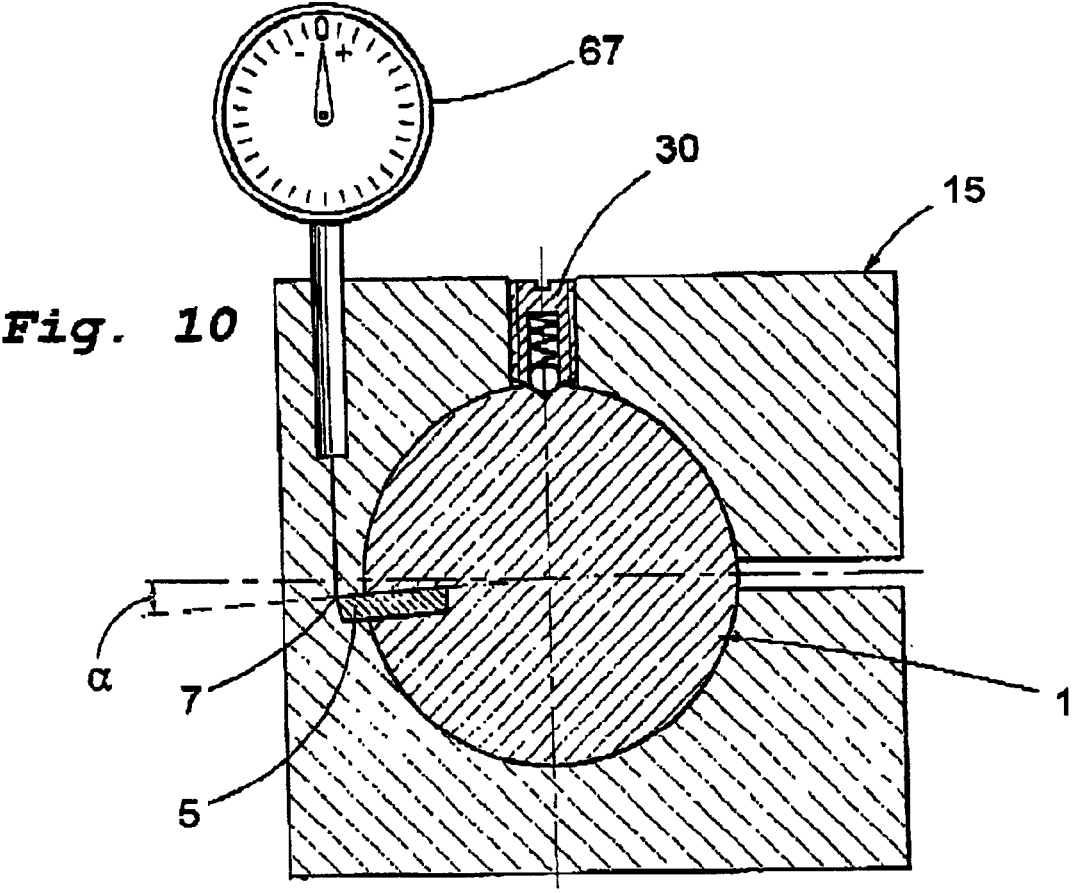
FIG. 10 is a detailed cross-sectional view of the cutting tool in the tool-clamping device showing the means of measuring the cutting edge height.

FIG. 10 illustrates a test apparatus used to assess the repeatable positional accuracy obtained using the spring-loaded device according to the invention and the conventional scribe line method, i.e., the method using the scribe lines 25B, 27B described in connection with FIG. 3 which shows the test apparatus in use with the system according to the invention. The cutting tool 1 is mounted in the tool clamping device 15 and the cutting tool is brought into the desired position by being rotated until a slight increase of force is required to rotate it further in either direction. The clock gauge 67 is then used to measure the height of the cutting edge 7 on the insert 5. In the alternative method scribe lines on the envelope surface of the cutting tool and on the front face of the tool clamping device were brought in line to obtain the desired position of the cutting edge.

Practical tests were carried out by the test apparatus illustrated in FIG. 10 using a group of highly experienced mechanics to compare the results of aligning a cutting tool using scribe lines with those obtained using the sphere and groove method of the invention.

Results of Laboratory Test of Indexing of Boring Bar
Bar used A06F-STFCR 06-R in sleeve 131-2006-A
Deviation of Height of Operative Cutting Edge from Correct Value Measured (in 1/100 mm) with Clock Gauge Following the Aligning of the Cutting Tool.

| Test person | Indexing line to line | Indexing with the invention |
|---|---|---|
| 1 | −19 | 0 |
| 2 | +3 | −1 |
| 3 | 0 | 0 |
| 4 | +10 | −2 |
| 5 | −10 | −1 |
| 6 | +16 | −1 |
| 7 | +2 | −1 |
| 8 | +6 | −2 |
| 9 | +14 | −2 |
| 10 | +6 | −2 |
| Total deviation | Σ 0.86 mm | Σ 0.11 mm |
| Average deviation | 0.86/10 = 0.086 | 0.11/10 = 0.011 |

$$\tan\alpha = \frac{0.086}{4.5} = 0.0191 \qquad \tan\alpha = \frac{0.011}{4.5} = 0.0024$$
$$= 1°5' \qquad\qquad\qquad = 0°8'$$

As can be seen from the table the conventional scribe line method gave an average deviation in cutting edge height of 0.086 mm whereas the method according to the invention produced an average of 0.011 mm. The values correspond to angular deviations of 1°5' and 0°8' respectively. In other words, the use of the spring-loaded device produced more than eight times greater precision than the scribe line method.

Feasible Modifications of the Invention

The invention is not solely restricted to the embodiments described and shown in the drawings. Thus the invention may also apply to solutions where the positions of the recesses and spring-loaded devices have been reversed. That is to say, the spring-loaded device or devices could be mounted in the envelope surface of the cutting tool, and the recesses formed in the inner surface of the aperture 23. Similarly other combinations of the groove and dimple solutions shown in FIGS. 4 to 4c are possible, for example a combination of FIGS. 4 and 4b.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A cutting tool system comprising:
    a clamping device including a clamping block having an aperture, the aperture including an aperture surface;
    a cutting tool including a front portion at which a cutting edge is disposed, and a shaft extending rearwardly from the front portion, the shaft being fixed in the aperture by a tool-securing clamping force that is releasable to enable the shaft to be displaced relative to the clamping device to a desired position for properly orienting the cutting edge, the shaft including an outer envelope surface facing the aperture surface;
    a spring-loaded element projecting from one of the envelope surface and the aperture surface and biased by a spring force acting in a direction of bias wherein the spring-loaded element yieldably engages a recess formed in the other of the envelope surface and the aperture surface when the cutting tool and its cutting edge are in the desired position, to provide an indication that the cutting tool is in such desired position by requiring a sudden increase in a force necessary to displace the cutting tool from the desired position, wherein the spring-loaded element is displaceable from the recess in a direction of displacement which is substantially oppsite the direction of bias; and
    a clamp actuator arranged to act on the clamping block to cause the clamping block to apply the tool-securing clamping force to the shaft independently of the spring-loaded element.

2. The cutting tool system according to claim 1 wherein the shaft, when the clamping force is released, is displaceable by being rotatable about a longitudinal axis of the shaft, the spring-loaded element opposing such rotation of the shaft.

3. The cutting tool system according to claim 1 wherein the shaft, when the clamping force is released, is displaceable along a longitudinal axis of the shaft, the spring-loaded element opposing such longitudinal movement of the shaft.

4. The cutting tool system according to claim 3 wherein the shaft, when the clamping force is released, is also displaceable by being rotatable about the longitudinal axis, the spring-loaded element opposing such rotation.

5. The cutting tool system according to claim 1 wherein the shaft portion and the aperture define a common longitudinal axis, the envelope surface being substantially cylindrical and the recess comprises a groove extending parallel to the longitudinal axis.

6. The cutting tool system according to claim 1 wherein the shaft portion and the aperture define a common longitudinal axis, the envelope surface being substantially cylindrical, the recess comprising at least one dimple.

7. The cutting tool system according to claim 6 wherein the at least one dimple comprises a line of dimples extending parallel to the axis.

8. The cutting tool system according to claim 1 wherein the shaft portion and the aperture define a common longitudinal axis, the recess comprising at least one groove lying in a plane oriented perpendicularly to the axis.

9. The cutting tool system according to claim 1 wherein the envelope surface and the aperture define a common longitudinal axis, the envelope surface and the aperture surface being of polygonal cross section, the recess comprising at least one groove lying in a plane oriented perpendicularly to the axis.

10. The cutting tool system according to claim 1 wherein the recess has a generally V-shaped cross section, the spring-loaded element comprising a rotatable element.

11. A tool-clamping device comprising a block having an aperture adapted to receive and clamp a shaft of a cutting tool, a spring-loaded element mounted in the block and projecting into the aperture for yieldably contacting the shaft, and a clamping actuator arranged to act on the block independently of the spring-loaded element for reducing a cross section of the aperture to clamp the shaft, wherein the element is loaded by a spring force acting in a direction of bias, the element being displaceable counter to the spring bias in a direction of displacement which is substantially opposite the direction of bias.

12. The tool-clamping device according to claim 11 wherein the spring-biased element comprises a rotatable element spring-biased toward the aperture.

13. The tool-clamping device according to claim 12 wherein the rotatable element comprises a sphere.

14. A cutting tool system comprising:
a clamping device including a clamping block having an aperture, the aperture including an aperture surface;
a cutting tool including a front portion at which a cutting edge is disposed, and a shaft extending rearwardly from the front portion, the shaft being fixed in the aperture by a clamping force that is releasable to enable the shaft to be displaced relative to the clamping device to a desired position for properly orienting the cutting edge, the shaft including an outer envelope surface facing the aperture surface, and
a spring-loaded device projecting from one of the envelope surface and the aperture surface and yieldably engaging a recess formed in the other of the envelope surface and the aperture surface when the cutting tool and its cutting edge are in the desired position, to provide an indication that the cutting tool is in such desired position by requiring a sudden increase in a force necessary to displace the cutting tool from the desired position;
wherein the shaft, when the clamping force is released, is displaceable by being rotatable about a longitudinal axis of the shaft, the spring-loaded device opposing such rotation of the shaft.

15. A cutting tool system comprising:
a clamping device including a clamping block having an aperture, the aperture including an aperture surface;
a cutting tool including a front portion at which a cutting edge is disposed, and a shaft extending rearwardly from the front portion, the shaft being fixed in the aperture by a clamping force that is releasable to enable the shaft to be displaced relative to the clamping device to a desired position for properly orienting the cutting edge, the shaft including an outer envelope surface facing the aperture surface, and
a spring-loaded device projecting from one of the envelope surface and the aperture surface and yieldably engaging a recess formed in the other of the envelope surface and the aperture surface when the cutting tool and its cutting edge are in the desired position, to provide an indication that the cutting tool is in such desired position by requiring a sudden increase in a force necessary to displace the cutting tool from the desired position;
wherein the shaft portion and the aperture define a common longitudinal axis, the envelope surface being substantially cylindrical and the recess comprises a groove extending parallel to the longitudinal axis.

16. A cutting tool system comprising:
a clamping device including a clamping block having an aperture, the aperture including an aperture surface;
a cutting tool including a front portion at which a cutting edge is disposed, and a shaft extending rearwardly from the front portion, the shaft being fixed in the aperture by a clamping force that is releasable to enable the shaft to be displaced relative to the clamping device to a desired position for properly orienting the cutting edge, the shaft including an outer envelope surface facing the aperture surface; and
a spring-loaded device projecting from one of the envelope surface and the aperture surface and yieldably engaging a recess formed in the other of the envelope surface and the aperture surface when the cutting tool and its cutting edge are in the desired position, to provide an indication that the cutting tool is in such desired position by requiring a sudden increase in a force necessary to displace the cutting tool from the desired position;
wherein the shaft portion and the aperture define a common longitudinal axis, the recess comprising at least one groove lying in a plane oriented perpendicularly to the axis, the at least one groove comprising a plurality of grooves spaced apart along the axis at regular 10 mm intervals.

17. A cutting tool system comprising:
a clamping device including a clamping block having an aperture, the aperture including an aperture surface;
a cutting tool including a front portion at which a cutting edge is disposed, and a shaft extending rearwardly from the front portion, the shaft being fixed in the aperture by a tool-securing clamping force that is releasable to enable the shaft to be displaced relative to the clamping device to a desired position for properly orienting the cutting edge, the shaft including an outer envelope surface facing the aperture surface;
a spring-loaded element projecting from one of the envelope surface and the aperture surface and yieldably engaging biased by a spring force acting in a direction of bias wherein the spring-loaded element yieldably engages a recess formed in the other of the envelope surface and the aperture surface when the cutting tool and its cutting edge are in the desired position, to provide an indication that the cutting tool is in such desired position by requiring a sudden increase in a force necessary to displace the cutting tool from the desired position; and
a clamp actuator arranged to act on the clamping block to cause the clamping block to apply the tool-securing clamping force to the shaft independently of the spring-loaded element;
wherein the shaft, when the clamping force is released, is displaceable along a longitudinal axis of the shaft, the spring-loaded element opposing such longitudinal movement of the shaft;
wherein the shaft, when the clamping force is released, is also displaceable by being rotatable about the longitudinal axis, the spring-loaded element opposing such rotation.

18. A cutting tool system comprising:

a clamping device including a clamping block having an aperture, the aperture including an aperture surface;

a cutting tool including a front portion at which a cutting edge is disposed, and a shaft extending rearwardly from the front portion, the shaft being fixed in the aperture by a tool-securing clamping force that is releasable to enable the shaft to be displaced relative to the clamping device to a desired position for properly orienting the cutting edge, the shaft including an outer envelope surface facing the aperture surface;

a spring-loaded element projecting from one of the envelope surface and the aperture surface and yieldably engaging biased by a spring force acting in a direction of bias wherein the spring-loaded element yieldably engages a recess formed in the other of the envelope surface and the aperture surface when the cutting tool and its cutting edge are in the desired position, to provide an indication that the cutting tool is in such desired position by requiring a sudden increase in a force necessary to displace the cutting tool from the desired position; and a clamp actuator arranged to act on the clamping block to cause the clamping block to apply the tool-securing clamping force to the shaft independently of the spring-loaded element;

wherein the shaft portion and the aperture define a common longitudinal axis, the recess comprising at least one groove lying in a plane oriented perpendicularly to the axis.

19. The cutting tool according to claim 18 wherein the at least one groove comprises a plurality of grooves spaced apart along the axis at regular intervals.

20. The cutting tool system according to claim 19 wherein the grooves are spaced apart by about 10 mm.

21. A cutting tool system comprising: a clamping device including a clamping block having an aperture, the aperture including an aperture surface;

a cutting tool including a front portion at which a cutting edge is disposed, and a shaft extending rearwardly from the front portion, the shaft being fixed in the aperture by a tool-securing clamping force that is releasable to enable the shaft to be displaced relative to the clamping device to a desired position for properly orienting the cutting edge, the shaft including an outer envelope surface facing the aperture surface;

a spring-loaded element projecting from one of the envelope surface and the aperture surface and yieldably engaging biased by a spring force acting in a direction of bias wherein the spring-loaded element yieldably engages a recess formed in the other of the envelope surface and the aperture surface when the cutting tool and its cutting edge are in the desired position, to provide an indication that the cutting tool is in such desired position by requiring a sudden increase in a force necessary to displace the cutting tool from the desired position; and a clamp actuator arranged to act on the clamping block to cause the clamping block to apply the tool-securing clamping force to the shaft independently of the spring-loaded element;

wherein the shaft portion and the aperture define a common longitudinal axis, the recess comprising at least one groove lying in a plane oriented perpendicularly to the axis.

22. The cutting tool system according to claim 21 wherein the at least one groove comprises a plurality of grooves spaced apart at regular intervals along the axis.

23. A cutting tool system comprising:

a clamping device a clamping block having a aperture, the aperture including an aperture surface;

a cutting tool including a front portion at which a cutting edge is disposed, and a shaft extending rearwardly from the front portion, the shaft being fixed in the aperture by a tool-securing clamping force that is releasable to enable the shaft to be displaced relative to the clamping device to a desired position for properly orienting the cutting edge, the shaft including an outer envelope surface facing the aperture surface;

a spring-loaded element projecting from one of the envelope surface and the aperture surface and yieldably engaging biased by a spring force acting in a direction of bias wherein the spring-loaded element yieldably engages a recess formed in the other of the envelope surface and the aperture surface when the cutting tool and its cutting edge are in the desired position, to provide an indication that the cutting tool is in such desired position by requiring a sudden increase in a force necessary to displace the cutting tool from the desired position; and a clamp actuator arranged to act on the clamping block to cause the clamping block to apply the tool-securing clamping force to the shaft independently of the spring-loaded element;

wherein the recess has a generally V-shaped cross section, the spring-loaded element comprising a rotatable element.

24. The cutting tool system according to claim 23 wherein the rotatable element is a sphere.

25. The cutting tool system according to claim 23 wherein a spring biasing the rotatable element comprises a coil spring.

26. The cutting tool system according to claim 23 wherein a spring biasing the rotatable element comprises an elastomer.

27. The cutting tool system according to claim 23 wherein a center of the rotatable element is situated outside of the recess.

28. The cutting tool system according to claim 27 wherein the recess defines a V-shape having an angle in the range of 35–85°.

29. The cutting tool system according to claim 28 wherein the angle is in the range of 55–65°.

30. The cutting tool system according to claim 28 wherein the angle is substantially 60°.

* * * * *